Patented Feb. 25, 1941

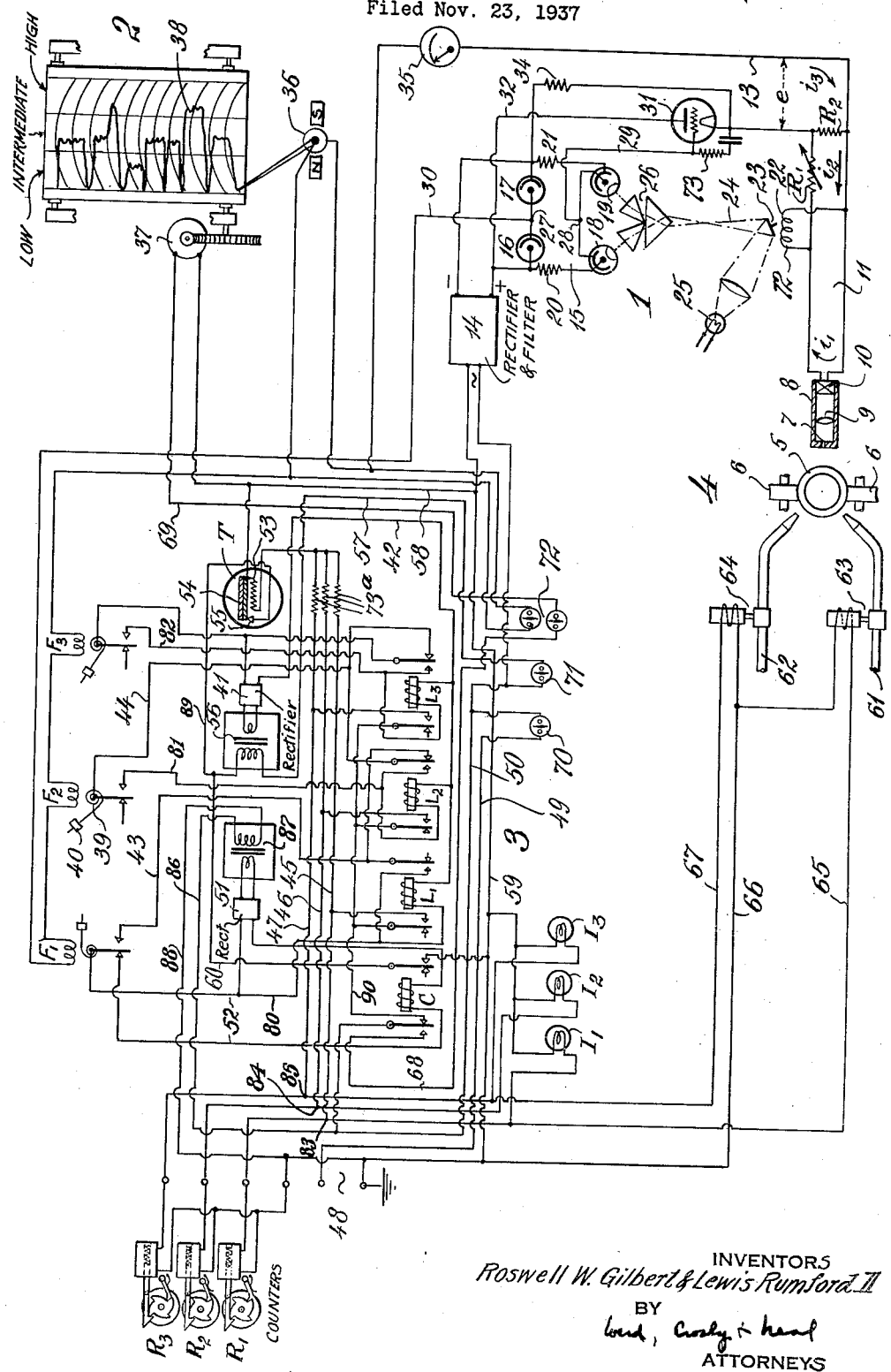

2,233,285

UNITED STATES PATENT OFFICE 2,233,285

HIGH SPEED RADIATION PYROMETRIC APPARATUS

Roswell Ward Gilbert, Montclair, N. J., and Lewis Rumford, II, Baltimore, Md., assignors to Weston Electrical Instrument Corporation, Newark, N. J., a corporation of New Jersey Application November 23, 1937, Serial No. 176,036

8 Claims. (Cl. 88—22.5)

This invention pertains to method and apparatus for automatically indicating and recording the instantaneous value as well as the maximum value within successive arbitrarily chosen ranges, of an electrically interpretable quantity subject to variation; such as the temperature or luminosity of a heated or incandescent object, the speed of rotation of a shaft, etc., the degree of acidity or pH value of an industrial solution, etc., etc. More particularly the invention relates to high speed pyrometric apparatus automatically operative for visually indicating and recording both the instantaneous temperature for each of a series of variably heated objects as well as the maximum temperature of each within selected ranges; and for grading and classifying such objects according to temperature, by distinctively marking said objects according to their maximum temperature ranges respectively, and by counting the total number of objects having maximum temperatures within each of the ranges aforesaid.

The invention finds application, among others, in the manufacture of butt-welded steel pipe, the temperature of which during welding, must be held within definitely prescribed limits in order to assure a satisfactory finished article. It is, therefore, important to know the variations in surface temperature from end-to-end of each pipe immediately after it has been welded, that is, directly after the pipe passes through the welding bell. And since in the commercial production of such pipe, the pipe sections pass through the welding bell quite rapidly, a matter of about two seconds for standard lengths of certain sizes with intervals of about one second between passages, it is desirable that some means be provided for automatically apprising the operator, as by visual signals, whether the maximum temperature of each section is within, above, or below the prescribed temperature range, and for counting the pipes within each such temperature range as well as for distinctively marking the sections which are too hot or too cold, so that they may be later identified as such.

Heretofore, the development of acceptable apparatus for purposes stated above, has been hampered for lack of a device capable of translating instantaneous temperatures in terms of an electrical current of sufficient magnitude and with sufficient rapidity of response to control such apparatus effectively and accurately in accordance with the temperature conditions prevailing along the pipe sections as they pass into the welding bell. Moreover, the functioning of known types of devices for translating temperature in terms of an electrical current, is markedly influenced by the notoriously poor electrical power supply available in steel mills, the voltage and frequency of which are subject to fluctuation within wide limits; while devices operated from storage batteries are not practical for such service.

In Patent No. 2,059,786, granted November 3, 1936, to one of the applicants, R. W. Gilbert, herein, there is described a translating device termed a "photoelectric potentiometer" which overcomes the objections above stated, and which responds practically instantaneously to temperature variations to provide an amplified electrical current of proportional value, of such magnitude as to operate directly such rugged current indicating devices as visual and graphical recording milli-ammeters, and such additional apparatus, for example control relays, as is required for accomplishing the purposes above stated. The construction and operation of the aforesaid "photoelectric potentiometer" is, moreover, such as to be unaffected by the variations in voltage and frequency to which the electrical power supply of steel mills is subject.

In its preferred embodiment the invention employs in conjunction with a photoelectric potentiometer of the type above stated, a system of relays and lights for visually indicating whether the maximum temperature of each pipe is above, below or within the prescribed temperature range, for counting the number of pipes falling within each range, and for distinctively marking the pipe sections which pass into the welding bell too hot or too cold. There is also associated with the apparatus, a graphical recorder of standard construction, the chart drive motor of which is automatically so controlled by the relay system that the motor operates only during passage of a pipe section past the photoelectric potentiometer, the motor being deenergized during the intervening intervals thereby to conserve the paper of the chart roll and to provide a condensed graphical record of the instantaneous temperatures throughout the length of each pipe section.

The single figure of the drawing shows diagrammatically and in operative assembly a system in accordance with a preferred embodiment of the invention for performing the functions above stated.

Referring to the drawing, the photoelectric potentiometer is shown at 1, the graphical temperature recorder at 2, the relay system at 3 for visually indicating and counting the pipes having maximum temperature within each range, and the pipe conveying and marking apparatus at 4.

The pipe lengths, one of which is shown in end elevation at 5, are propelled by motor driven rollers 6 or other suitable means, longitudinally past a slotted aperture 7 of a photoelectric pick-up element 8, containing an optical system 9, for directing radiant energy emitted from the pipe section at the point of pick-up, onto a photocell 10, preferably of the self generating type which requires no auxiliary batteries, for converting the radiant energy incident thereon into an electrical current $i_1$, of proportional—though not necessarily directly proportional—magnitude, flowing in an output circuit 11.

The pick-up element 8 is connected to the photo-electric potentiometer 1 of the type described in Patent No. 2,059,786 aforesaid. The photocell output circuit 11 is of the type described in said patent which measures the short circuited output current of the cell. To this end a galvanometer actuating coil 12 is bridged directly across the cell output as shown; while resistors $R_1$ and $R_2$ in series, are bridged across the opposite side of this coil. If now a voltage $e$ is impressed across resistor $R_1$ in such polarity as to produce a current $i_2$ in resistor $R_1$ which tends to flow through coil 12 in a direction opposite to that of current $i_1$, and if moreover the voltage $e$ is of such magnitude that current $i_2$ equals current $i_1$, the resultant current flow in coil 12 will be zero, and current $i_2$ will be equal to the short circuited output current $i_1$, of the photocell. The current $i_3$ which flows in the circuit 13 across which the voltage $e$ is applied, is directly proportional to the current $i_2$ in the ratio of $$\frac{R_1+R_2}{R_1}$$

so that when the condition of balance is obtained, current $i_3$ measures on a greatly amplified scale, the short circuited output current $i_1$ of the photocell and thereby the temperature of the pipe 5 at the point of pick-up.

The potentiometer operates in such a way as automatically to adjust and maintain the current $i_2$ equal to the short circuited output current $i_1$ of the photocell, irrespective of the manner and extent to which current $i_1$ may vary due to temperature variations along the surface of the pipe. To this end the potentiometer comprises in addition to the elements above stated, a rectifier and filter system 14 for converting an alternating current input voltage into a substantially non-pulsating direct current output voltage applied to an electrical bridge 15 having as adjacent balancing arms of fixed voltage ratio, a pair of gaseous discharge tubes 16, 17; and as adjacent balancing arms of variable voltage ratio, a pair of photoelectric tubes 18, 19 in series with protective resistors 20, 21 respectively.

The movable element of the galvanometer 22 having actuating coil 12, comprises a pivoted mirror element 23 which reflects a focussed light beam 24 from source 25 onto the apex of a prism system 26, which splits the incident beam into a pair of emergent beams directed onto the photo-tubes 18 and 19 respectively. Thus, any deflection of the mirror increases the illumination of one tube and correspondingly decreases the illumination of the other, and thus by so altering the ratio of the variable ratio balancing arms, controls the magnitude and polarity of voltage occurring between conjugate points 27, 28 of the bridge. This voltage is impressed over conductor 29 and over a circuit including conductors 30 and 13 (traced through the relay system 3 as hereinafter described) between the grid and cathode electrode of an electronic tube 31, the plate circuit of which also includes the circuit traced over conductors 30 and 13, as well as the voltage drop across the glow discharge tube 16, owing to connection of the plate electrode of the tube over conductor 32 to the positive terminal of the rectifier output. Thus the plate current of tube 31 traverses circuit 11 containing resistors $R_1$ and $R_2$. Ordinarily the optimum range of plate current of the tube does not coincide with the range of current desired for operation of circuit 11. The current traversing circuit 11 is therefore compensated to an appropriate range of value by connecting the negative terminal of the rectifier 14 output, through resistor 34 to the cathode of tube 31.

With the circuit as so arranged, any deviation in the output current $i_1$ of photocell 10 from equality with current $i_2$, comprising a portion of the plate current of tube 31, will produce a flow of unbalance current in the galvanometer coil 12 of such magnitude and polarity as to adjust mirror 23 to a position for causing phototubes 18 and 19 to be so illuminated as to apply a voltage to the grid circuit of tube 31 which will adjust the plate current thereof to just the right value for restoring current $i_2$ in circuit 11 to equality with current $i_1$, in the manner described in Patent No. 2,059,786 aforesaid.

As ordinarily constructed resistors $R_1$ and $R_2$ are so chosen that the magnitude of current of $i_3$ in conductor 13 is about one thousand times that of current $i_2$, so that for the condition of balance, a current is obtained in conductor 13 which measures in milli-amperes the output current $i_1$ of photocell 10, which is a matter of micro-amperes. Thus a current is obtained which varies as a function of the instantaneous temerature of the pipe adjacent the pick-up 8, and which is of sufficient magnitude to operate directly, rugged instruments, such as milli-ammeters and relays for performing the functions of the system as above outlined. Moreover, since the automatic adjustment of the potentiometer circuit to a condition of balance is practically instantaneous, the current in conductor 13 follows faithfully the instantaneous temperature variations along the pipe surface as the pipe is propelled past the pick-up element.

For visually indicating these instantaneous temperature variations, a milli-ammeter 35 is interposed in conductor 13, the scale of which reads temperatures directly. The circuit including conductors 13 and 30 extends through the actuating coil of a galvanometer 36 for driving the stylus of the graphical recorder 2, the chart feed of which is driven by a motor 37. Thus there is provided a graphical record, such as 38, of the temperature variations throughout the length of each pipe section. The motor 37 is energized, in a manner to be explained, only while a pipe section is passing the pick-up 8, being de-energized at other times to provide thereby a compact temperature record for successive pipe lengths, and to conserve space on the chart.

The circuit extending over conductor 13 from the cathode of tube 31, extends through the recording galvanometer 36 as explained, and thence through a group of three relays $F_1$, $F_2$, $F_3$ and back to the potentiometer circuit over conductor 30, thereby completing the circuit traversed by the measuring current $i_3$. The relays in question form part of the relay system 3 which functions in a manner now to be explained.

Each of the relays $F_1$, $F_2$, $F_3$ is provided with an armature normally biased against its back contact as shown, by a coiled spring, such as 39, the end of which passes through a clamp 40, whereby the spring tension may be adjusted. In this manner the relays $F_1$, $F_2$, $F_3$ are adjusted to operate on progressively increasing currents respectively, corresponding to maximum pipe temperatures which are below, within, and above the prescribed temperature range for satisfactory operation. Thus if the maximum pipe temperature is below the prescribed range only relay $F_1$ will operate, this relay moreover being so adjusted that it will operate and remain continuously operated while a pipe is passing the potentiometer pick-up, but will release during intervals between such passages. If the maximum pipe temperature falls within the prescribed range, relay $F_2$ will also operate while this condition exists; and similarly relay $F_3$ will operate during intervals that the maximum temperature is above the prescribed range.

Individual to the relays $F_1$, $F_2$, $F_3$ comprising a first group, are locking relays $L_1$, $L_2$, $L_3$ comprising a second group. According to the schematic showing in the drawing, each of these locking relays is provided at the left and right, with armatures operating between front and back contacts. An energizing circuit for relay $L_1$ extends from a low voltage output of a rectifier 41 over conductor 42, through the winding of relay $L_1$, over conductor 80 and through the armature and front contact of relay $F_1$, over conductor 43, and through the right back contact and armature of locking relays $L_2$ and $L_3$ in series, returning thence to rectifier 41. Similarly, an energizing circuit for relay $L_2$ extends from rectifier 41, over conductor 42 through the winding of $L_2$, over conductor 81 and through the front contact and armature of relay $F_2$, over conductor 44, and through the right back contact and armature of locking relay $L_3$ to the rectifier 41. An energizing circuit for relay $L_3$ extends from rectifier 41 over conductor 42 and through the winding of $L_3$, over conductor 82 and through the right front contact and armature of relay $F_3$ to the rectifier 41. Each of relays $L_1$, $L_2$, $L_3$ contains locking contacts, comprising its right front contact and armature, which are arranged in parallel with the energizing contacts of the associated relays $F_1$, $F_2$, $F_3$.

Owing to this arrangement, the locking relay corresponding to the maximum temperature range of a given pipe section, will be automatically selected and locked. Assume, for example, that a given pipe length is too cold throughout, so that during the passage past the photoelectric pick-up, only relay $F_1$ of the first group will be operated. Operation of this relay will cause only relay $L_1$ of the second group, to operate and lock over the circuit traced. Should, however, a portion of the pipe be sufficiently hot to also operate relay $F_2$, the associated relay $L_2$ will be energized and lock-up over the circuit above described, and in so doing will release relay $L_1$ due to the opening of its holding circuit at the right back contact of relay $L_2$. Should, moreover, a portion of the pipe be sufficiently hot to operate relay $F_3$, relay $L_3$ will operate over the circuit traced, to release either relay $L_1$ or relay $L_2$, due to the opening of the holding circuit for these relays at the right back contact of relay $L_3$. Thus, the only locking relay which remains operated as a given pipe section passes beyond the potentiometer pick-up 8, is that corresponding to the highest temperature range recorded throughout the length of the pipe.

Individually associated with the locking relays $L_1$, $L_2$, $L_3$ over conductors 45, 46, 47, are counting magnets $R_1$, $R_2$, $R_3$ and lamps $I_1$, $I_2$, $I_3$. An energizing circuit for each counter and lamp is traced from the non-grounded side of the power input terminals 48 (fed from a source of alternating current voltage not shown) over conductor 49, through switch 70 and over conductor 50, through the left armature and front contact of a control relay C, to conductor 90, thence through the left armature and front contact of the associated locking relay L, to one of conductors 45, 46, 47 and thence over paths dividing at 83, 84, 85 through the associated counting magnet R and lamp I respectively to the grounded side of input terminals 48.

The control relay C is energized from the output of a rectifier 51, over a circuit 52 traced through the armature and back contact of relay $F_1$. Rectifier 51 is in turn energized from power source 48, over a circuit extending from the upper terminal 48 over conductor 49, through switch 70 and over conductors 50 and 86, through the primary winding of an input transformer 87 supplying rectifier 51, returning thence over conductor 88 to the lower terminal of the power source 48. As has been stated, relay $F_1$ is operated during passage of a pipe section past the photoelectric pick-up 8, and is released during the intervening intervals. Accordingly the counting relay and lamp circuits are maintained open at the front contact of the control relay C while the pipe is passing the photoelectric pick-up, and thus during selection and locking of the locking relay corresponding to the highest temperature of the pipe section. So soon, however, as the pipe section passes beyond the pick-up 8 to release relay $F_1$, relay C will operate thereby to complete the circuits described, traced through the left armature and front contact of the locked relay L, to operate the associated counting magnet R and to energize the associated lamp I. Thus if relay $L_2$ remains locked, counter $R_2$ and lamp $I_2$ will be energized, the latter to provide a visual indication to the operator as to the maximum temperature of the pipe section last to pass the pick-up 8.

In order to release the apparatus as thus energized and clear the system for reception of the next succeeding pipe section, a thermally actuated relay T is provided. This relay contains a heating element 53 and a bimetallic strip 54 which forms a normally closed contact with contact 55. The heating element on being energized heats strip 54 until the latter moves away from contact 55. An input transformer 56 supplying rectifier 41 which in turn energizes the locking relay L, receives power from terminals 48 over a circuit traced from the upper terminal 48, over conductor 49, switches 70 and 71, conductor 57, through the primary winding of transformer 56, over conductor 89, through contacts 55, 54 of the thermal relay T, and over conductors 58 and 59 to the lower terminal 48. A circuit for energizing the heating element 53 of this relay is traced from the upper of input terminals 48 over conductors 49, 50, and interposed switch 70, through the left armature and front contact of the control relay C, and through the left armatures and front contacts in parallel of the locking relays L₁, L₂, L₃, to one of the conductors 45, 46, 47, through the heating element 53 of relay T, returning to the lower terminal 48 over conductors 58 and 59. Accordingly, when the control relay C operates, as a pipe section passes beyond the photocell pick-up, a circuit is completed through the left armature and front contact of the locked relay L, to energize the heating element of relay T, the contacts of which are opened as explained, to open the supply circuit of the input transformer to rectifier 41, thereby to deenergize the rectifier and hence the locked relay L energized therefrom, which on releasing, opens at its left front contact the circuits traced for energizing the associated counting magnet R, lamp I, and the heating element of relay T. The counting relay is then released, the lamp extinguished, and the bimetallic strip of relay T permitted to cool whereby it again returns to contact 55, thereby to restore the entire system to normal, for automatic operation with respect to the next succeeding pipe section in the manner described. As an added precaution to insure that the system will be rendered operative for indicating as to the next pipe section should the bimetallic strip 55 be slow in cooling and hence slow in returning to contact with contact 54, an alternative circuit for energizing rectifier 41 is provided, traced from the upper of output terminals 48, over conductor 49, through switches 70 and 71 to conductor 57, through the primary winding of transformer 56 to conductor 60 and through the armature and right back contact of control relay C to the lower of input terminal 48. As soon, therefore, as the advancing end of the next succeeding pipe section passes the photoelectric pick-up 8, thereby to release control relay C as explained, the alternative circuit above traced will be closed to assure energization of rectifier 41 irrespective of whether or not the thermally actuated relay is then closed.

For distinctively marking the pipe sections which are too hot or too cold, pipe lines 61, 62 extend from appropriate fluid pigment reservoirs (not shown) to nozzles directed toward the pipe 5 as shown. These pipe lines contain solenoid controlled valves 63, 64, the energizing coils of which are controlled respectively over the same circuits which control the energization of lamps I₁, I₃ and counting magnets R₁, R₃. These circuits are traced from the upper of input terminals 48, over conductors 49, 50, and interposed switch 70, through the left armature and front contact of control relay C, to conductor 90, thence through the left armature and front contact of the associated locking relay L₁ or L₃, to conductor 45 or 47, thence over conductor 65 or 67, through the actuating coil of valve 63 or 64 to ground at the lower terminal 48 over conductor 66. It will be observed that the operating circuits for valves 63, 64 are thus in parallel with the operating circuits previously traced for lamps I₁ and I₃ and counters R₁ and R₃ respectively. Accordingly, when either of lamps I₁ or I₃ is energized, in the manner explained, to visually indicate a pipe which is too hot or too cold, the associated valve 62 or 63 will be opened, causing pigment to be sprayed onto the pipe thereby to distinctively mark the same in accordance with its maximum temperature. It is to be understood, of course, that the spray pipes 61, 62, are positioned longitudinally of the pipe, sufficiently beyond the photoelectric pick-up 8, to be opposite the pipe length 5 to be marked at the instant valve 63 or 64 is opened coincident with the energization of lamp I₁ or I₃.

As above stated, the chart drive motor 37 of the graphical recorder is energized only during passage of a pipe section past the pick-up 8. This is accomplished by energizing the motor from input terminals 48 over a circuit traced from the upper input terminal 48, over conductors 49, 50 and interposed switch 70, left armature and back contact of the control relay C,—which as explained is released while the pipe is passing the pick-up 8—over conductors 68, 69 and interposed switch 72, and through the chart motor 37, returning to ground at the lower terminal 48 over conductors 58, 59.

The system is energized from the power input terminals 48, through the switch 70 whereby the power supply to the entire system may be cut off. The auxiliary switch 71 controls the energization of rectifier 41 thereby to cut off operation of the counting magnets R, lamps I and the pipe spraying control valves 63, 64. Operation of a gang switch 72 cuts out the chart drive motor 37 and short circuits the stylus recording galvanometer 36, whereby the recorder may be rendered inoperative.

Resistors 73a are interposed in the leads 45, 46, 47 extending from the left front contacts of the locking relays L to ground through the heating coil 53 of the thermally actuated relay T. This is done in order electrically to isolate from each other, the circuits through the counting magnets R and lamps I which extend from these same locking relay contacts to ground in parallel with the path to ground through the heating coil 53 of the thermally actuated relay T, and thereby to prevent the voltage drop to ground across coil 53 when energized from producing false operation of the counting magnets and lamps the circuits of which extend to contacts of the non-actuated locking relays, and to assure operation only of the counting magnet and lamp which are connected to whichever locking relay happens to be operated.

Resistance R₁ of the photoelectric potentiometer 1 is made adjustable for the purpose of calibrating the visual and recording galvanometers 35, 36 in terms of pipe temperatures adjacent the pick-up 8.

A resistance and condenser 73 in series may be connected between the grid and cathode of the photoelectric potentiometer tube 31, for adjusting the speed of response of the device as desired in accordance with the values chosen for these elements.

By the expression "exhibiting means" in the claims is meant visual indicating, registering or pipe marking means.

What we claim is:

1. High speed pyrometric apparatus for automatically grading heated elements according to temperature, comprising: a device for translating instantaneous temperatures in terms of an electrical current, means for exposing said elements in sequence to said device, means including a first group of relays responding respectively at progressively increasing minimum values of said current corresponding to progressively higher temperature ranges, and a second group of lock-up relays, said lock-up relays being individual to and energizable by associated relays of the first group for automatically selecting and locking the second group relay corresponding to the maximum temperature range of each said element, exhibiting means selectively responsive to paid lock-up relays and means responsive to non-exposure of each said element to said device following each said selection for actuating said exhibiting means in accordance with said maximum temperature range selection.

2. Apparatus for automatically exhibiting the maximum temperature within selected temperature ranges of a series of heated elements, comprising: a device for translating instantaneous temperatures in terms of an electrical current, a first group of relays responding to said current at progressively increasing minimum values thereof respectively corresponding to progressively higher temperature ranges, a locking relay of a second group associated with each relay of the first group and responding to energization thereof over a circuit completed through back contacts in series of each of the remaining second group relays associated with the first group relays of higher operating current, means for exposing said translating device to said heated elements in succession, whereby during the first such exposure the second group relay corresponding to the maximum temperature range of said element is automatically selected and locked, exhibiting means selectively responsive to said lock-up relays, means responsive to the subsequent non-exposure of said device to said element for actuating said exhibiting means in accordance with the temperature range thus selected, and means for thereafter releasing the operated locking relay and exhibiting means thereby to clear the apparatus for like exhibition as to the next said element.

3. High speed pyrometric apparatus comprising: a device for translating instantaneous temperatures in terms of an electrical current; a first group of relays responding respectively to said current at progressively increasing minimum values thereof corresponding to progressively higher temperature ranges; locking relays of a second group individual to said first group relays; each of said relays having front and back contacts; an energizing circuit for each second group relay including front contacts of the associated first group relay, back contacts in series of the remaining second group relays associated with the first group relays of higher operating current, and contacts of a normally closed slowly operated relay, said second group relays having locking contacts shunting the front contacts of the respective first group relays, whereby the second group relay corresponding to the maximum temperature range of an object during exposure to said device, is automatically selected and locked; exhibiting means individual to said second group relays; a control relay responding to release of the first group relay of lowest operating current to complete circuits through front contacts of the locked second group relay for energizing the associated exhibiting means and for energizing said slowly operated relay to open the contacts thereof thereby to release said locked second group relay.

4. Apparatus for automatically exhibiting the highest range within successive ranges of an electrically interpretable variable quantity, comprising: means for interpreting the instantaneous values of said quantity at a point of observation in terms of an electrical current, a first group of relays responding respectively at progressively increasing minimum values of said current corresponding to said ranges, and a second group of lock-up relays, said lock-up relays being individual to and energizable by associated first group relays, means associated with each first group relay for releasing, upon operation thereof, all second group relays associated with first group relays of lower operating current, and exhibiting means responsive to said lock-up relays for automatically exhibiting the maximum value of said quantity within the ranges aforesaid.

5. Apparatus for automatically indicating the highest range within successive ranges, attained by an electrically interpretable variable quantity, comprising: means for interpreting the instantaneous value of said quantity at a point of observation in terms of an electrical current, a first group of relays responding respectively to said current at progressively increasing minimum values thereof corresponding to the said ranges aforesaid respectively, a locking relay of a second group individual to each relay of the first group, each of the relays aforesaid having front and back contacts, an energizing circuit for each second group relay including front contacts of the associated first group relay and back contacts in series of the remaining second group relays associated with the first group relays of higher operating current, said second group relays having locking contacts shunting the front contacts of the associated first group relays, whereby the second group relay corresponding to the highest range attained by said quantity is automatically selected and locked.

6. Apparatus selectively responsive throughout successive ranges to the magnitude of an electrically interpretable quantity subject to variation, comprising: means for interpreting the said quantity in terms of an electrical current during subjection of said means to the action of said quantity, a first group of relays responding respectively to said current at progressively increasing minimum values thereof corresponding to the said ranges of said quantity respectively, a locking relay of a second group individual to each relay of the first group, each of the relays aforesaid having front and back contacts, an energizing circuit for each second group relay including front contacts of the associated first group relay and back contacts in series of the remaining second group relays associated with the first group relays of higher operating current, said second group relays having locking contacts shunting the front contacts aforesaid of their associated first group relays, whereby the second group relay corresponding to the highest range attained by said quantity is automatically selected and locked, exhibiting means selectively responsive to said locking relays, and means responsive to removal of said electrically interpretive means from the action of said quantity for actuating said exhibiting means in accordance with said selected range.

7. Apparatus for automatically exhibiting the maximum range within successive ranges, of an electrically interpretable quantity subject to variation, comprising: means for automatically interpreting said quantity in terms of an electrical current, a first group of relays responding to said current at progressively increasing minimum values thereof corresponding to said ranges respectively, a locking relay of a second group individual to each relay of the first group, means under control of a normally closed slowly operated relay for energizing any said relay of the second group in response to actuation of the associated relay of the first group and for locking the so actuated second group relay through non-actuated contacts of the remaining second group relays which respond to the first group relays of higher operating current, exhibiting means individually responsive to said second group relays, a control relay actuated on release of the first group relay of lowest operating current, and means responsive to actuation of said control relay and the concurrent actuation of a second group relay for actuating said exhibiting means and for energizing said slowly operated relay to thereafter release the same momentarily thereby to release said second group relay and exhibiting means.

8. Apparatus for automatically exhibiting the maximum range within successive ranges of an electrically interpretable variable quantity of a series of elements, comprising: a device for interpreting said quantity in terms of an electrical current, a first group of relays responding respectively to said current throughout progressively increasing minimum values thereof corsecond group relays associated with the first responding to said ranges respectively, a locking relay of a second group associated with each relay of the first group and responding to energization thereof over a circuit completed through back contacts in series of each of the remaining group relays of higher operating current, means subjecting said interpreting device to said elements in succession whereby during the first such subjection the second group relay corresponding to the maximum range of said quantity for said element is automatically selected and locked, and means responsive to the subsequent non-subjection of said device to said element for automatically exhibiting the range thus selected and for thereafter releasing the operated second group relay thereby to clear the apparatus for like indication as to the next said element.

ROSWELL WARD GILBERT.
LEWIS RUMFORD, II.

CERTIFICATE OF CORRECTION.

Patent No. 2,233,285. February 25, 1941.

ROSWELL WARD GILBERT, ET AL.

It is hereby certified that error appears in the printed specification of the above numbered patent requiring correction as follows: Page 5, first column, line 1, for the word "paid" read --said--; page 6, second column, line 2, claim 8, strike out the words "second group relays associated with the first" and insert the same after "remaining" in line 7, same claim; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.